(12) United States Patent
Liang

(10) Patent No.: US 9,665,480 B2
(45) Date of Patent: May 30, 2017

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 159 days.

(21) Appl. No.: 14/328,719

(22) Filed: Jul. 11, 2014

(65) Prior Publication Data

US 2015/0339225 A1    Nov. 26, 2015

(30) Foreign Application Priority Data

May 22, 2014    (TW) .............................. 103117942 A

(51) Int. Cl.
*G06F 12/00*    (2006.01)
*G06F 12/02*    (2006.01)

(52) U.S. Cl.
CPC .. *G06F 12/0246* (2013.01); *G06F 2212/1016* (2013.01); *G06F 2212/7201* (2013.01); *G06F 2212/7205* (2013.01)

(58) Field of Classification Search
CPC ......... G06F 12/0246; G06F 2212/7201; G06F 2212/7205; G06F 2212/1016
See application file for complete search history.

(56) References Cited

U.S. PATENT DOCUMENTS

| | | | |
|---|---|---|---|
| 2010/0228907 A1* | 9/2010 | Shen ................... | G06F 12/0246 711/103 |
| 2012/0017052 A1* | 1/2012 | Sauber ................ | G06F 12/0246 711/154 |
| 2013/0166824 A1* | 6/2013 | Shim ................... | G06F 12/0246 711/103 |
| 2015/0261671 A1* | 9/2015 | Chu ..................... | G06F 12/0246 711/103 |

FOREIGN PATENT DOCUMENTS

TW    200949537    12/2009

OTHER PUBLICATIONS

"Office Action of Taiwan Counterpart Application", issued on Aug. 17, 2015, p. 1-p. 10.

\* cited by examiner

*Primary Examiner* — Gurtej Bansal
(74) *Attorney, Agent, or Firm* — Jianq Chyun IP Office

(57) ABSTRACT

A memory management method, a memory storage device and a memory control circuit unit are provided. The memory management method includes: grouping a plurality of non-spare physical erasing units into a first physical erasing unit and a second physical erasing unit, and a data updating frequency of the first physical erasing unit is lower than the data updating frequency of the second physical erasing unit; selecting a third physical erasing unit from the physical erasing units belonging to the first physical erasing unit; selecting a fourth physical erasing unit from spare physical erasing units, and copying valid data stored in the third physical erasing unit to the fourth physical erasing unit.

18 Claims, 6 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 103117942, filed on May 22, 2014. The entirety of the above-mentioned patent application is hereby incorporated by reference herein and made a part of this specification.

BACKGROUND

Technical Field

The invention relates to a memory storage device, and more particularly, relates to a memory management method, and a memory storage device and a memory control circuit unit using the memory management method.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Generally, a memory storage device including a rewritable non-volatile memory module releases available physical blocks by executing a garbage collection procedure. However, the traditional garbage collection procedure does not take in consideration of whether data stored in a physical block is updated regularly. In case the data stored in a physical block is updated regularly, even if valid data stored in the physical block is moved to another physical block during the garbage collection procedure, it is still possible that the valid data is considered as invalid after being updated again, resulting in waste of system resources.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a memory management method, a memory storage device and memory control circuit unit, which are capable of reducing moving of data which are regularly updated, and improving efficiency of the garbage collection procedure.

A memory management method for managing a rewritable non-volatile memory module is provided according to an exemplary embodiment of the invention, wherein the rewritable non-volatile memory module has a plurality of physical erasing units. The memory management method includes: grouping a plurality of non-spare physical erasing units in the physical erasing units into at least one first physical erasing unit and at least one second physical erasing unit, wherein a data updating frequency of each first physical erasing unit is lower than the data updating frequency of each second physical erasing unit; selecting at least one third physical erasing unit from the first physical erasing unit; and selecting at least one fourth physical erasing unit from at least one spare physical erasing unit in the physical erasing units, and copying valid data stored in each third physical erasing unit to the fourth physical erasing unit.

A memory storage device is provided according to an exemplary embodiment of the invention, which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to group a plurality of non-spare physical erasing units in the physical erasing units into at least one first physical erasing unit and at least one second physical erasing unit, wherein a data updating frequency of each first physical erasing unit is lower than the data updating frequency of each second physical erasing unit. The memory control circuit unit is further configured to select at least one third physical erasing unit from the first physical erasing unit. The memory control circuit unit is further configured to select at least one fourth physical erasing unit from at least one spare physical erasing unit in the physical erasing units, and copy valid data stored in each third physical erasing unit to the fourth physical erasing unit.

A memory control circuit unit is provided according to an exemplary embodiment of the invention, and the memory control circuit unit is configured to control a rewritable non-volatile memory module. The memory control circuit unit includes a host interface, a memory interface and a memory management circuit. The host interface is configured to couple to a host system. The memory interface is configured to couple to the rewritable non-volatile memory module, wherein the rewritable non-volatile memory module comprises a plurality of physical erasing units. The memory management circuit is coupled to the host interface and the memory interface. The memory management circuit is configured to group a plurality of non-spare physical erasing units in the physical erasing units into at least one first physical erasing unit and at least one second physical erasing unit, wherein a data updating frequency of each first physical erasing unit is lower than the data updating frequency of each second physical erasing unit. The memory management circuit is further configured to select at least one third physical erasing unit from the first physical erasing unit. The memory management circuit is further configured to select at least one fourth physical erasing unit from at least one spare physical erasing unit in the physical erasing units, and copy valid data stored in each third physical erasing unit to the fourth physical erasing unit.

Based on above, the invention is capable of grouping a plurality of physical erasing units into at least two groups according to a data updating frequency of each of the physical erasing units, and executing a garbage collection procedure on at least a part of the physical erasing units with the data updating frequency being lower. As a result, moving of data which are regularly updated may be reduced, efficiency for executing the garbage collection procedure may be improved, and the system resources may also be saved.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
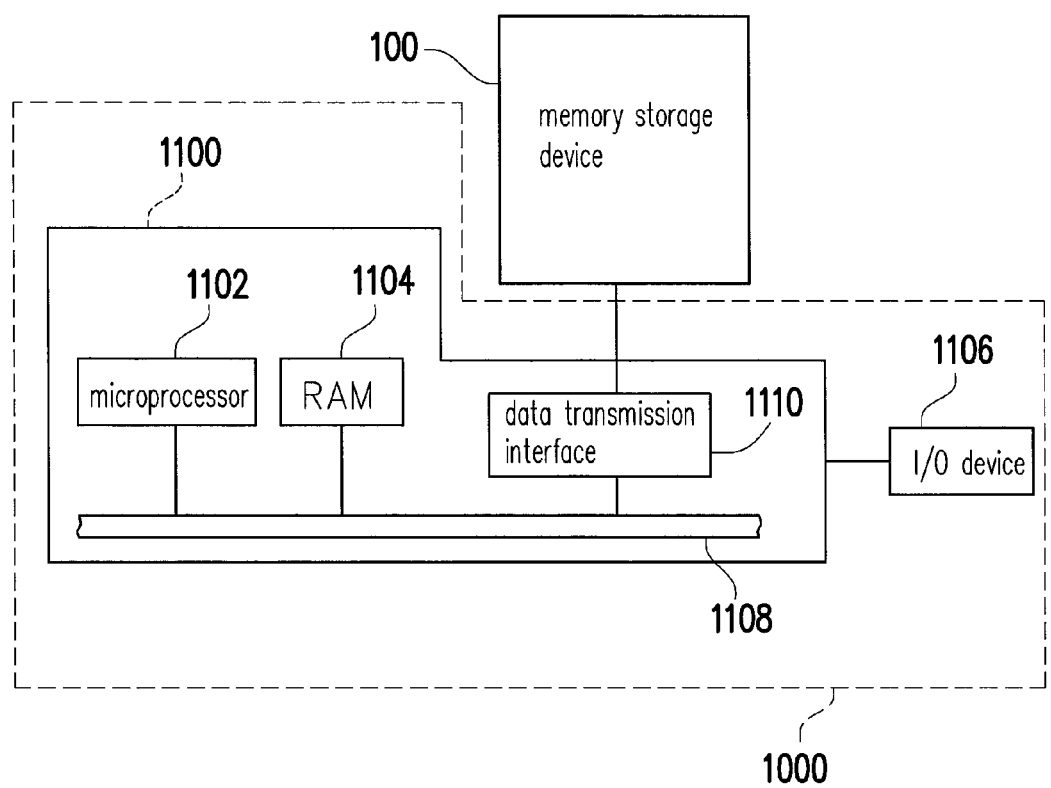
FIG. 1 illustrates a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 2:
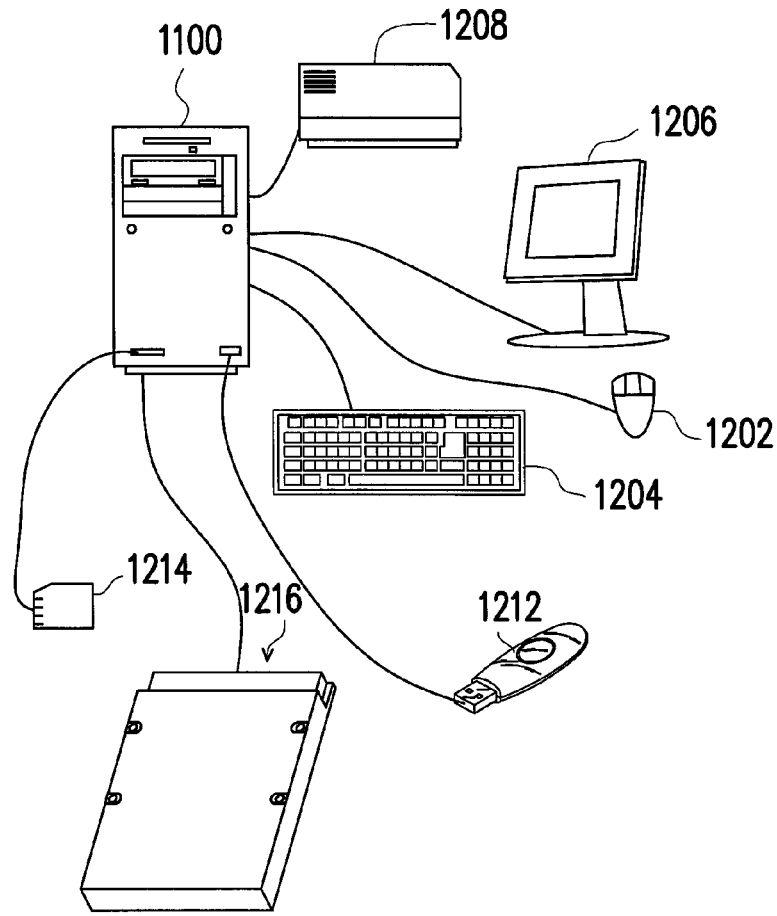
FIG. 2 is a schematic diagram illustrating a host system and an input/output device according to an exemplary embodiment of the invention.
Figure 3:
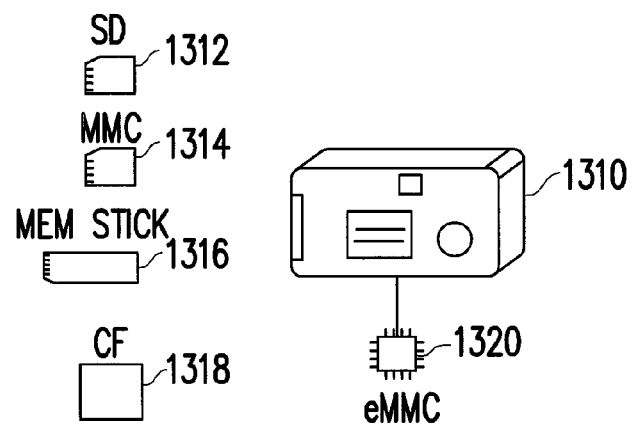
FIG. 3 is a schematic diagram illustrating a host system and a memory storage device according to an exemplary embodiment of the invention.

FIG. 1 is a schematic diagram illustrating a host system and a memory storage device according to an exemplary embodiment of the invention. FIG. 2 is a schematic diagram illustrating a host system and an input/output device according to an exemplary embodiment of the invention. FIG. 3 is a schematic diagram illustrating a host system and a memory storage device according to an exemplary embodiment of the invention.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In an exemplary embodiment, the memory storage device 100 is coupled to other devices of the host system 1000 through the data transmission interface 1110. By using the microprocessor 1102, the random access memory 1104 and the Input/Output (I/O) device 1106, data may be written into the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 2.

Generally, the host system 1000 may substantially be any system capable of storing data with the memory storage device 100. Although the host system 1000 is described as a computer system in the present exemplary embodiment, in another exemplary embodiment, the host system 1000 may be a digital camera, a video camera, a telecommunication device, an audio player, or a video player. For example, when the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
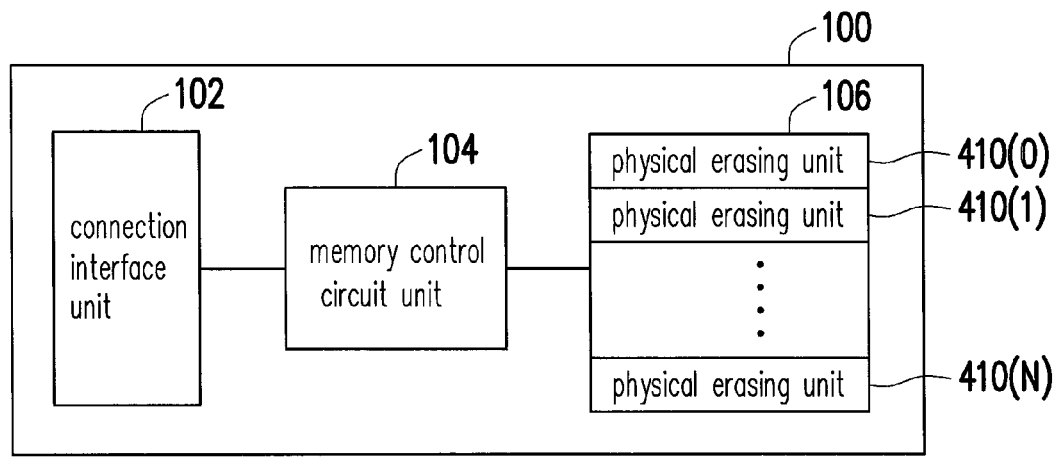
FIG. 4 is a schematic block diagram illustrating the memory storage device in FIG. 1.

FIG. 4 is a schematic block diagram of the memory storage device in FIG. 1.

Referring to FIG. 4, the memory storage device 100 includes a connection interface unit 102, a memory control circuit unit 104 and a rewritable non-volatile memory module 106.

In the present exemplary embodiment, the connection interface unit 102 is compatible with a serial advanced technology attachment (SATA) standard. However, the invention is not limited thereto, and the connection interface unit 102 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit 102 and the memory control circuit unit 104 may be packaged into one chip, or distributed outside of a chip containing the memory control circuit unit 104.

The memory control circuit unit 104 is configured to execute a plurality of logic gates or control commands which are implemented in a hardware form or in a firmware form, so as to perform operations of writing, reading or erasing data in the rewritable non-volatile memory module 106 according to the commands of the host system 1000.

The rewritable non-volatile memory module 106 is coupled to the memory control circuit unit 104 and configured to store data written from the host system 1000. The rewritable non-volatile memory module 106 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. For example, each physical erasing unit is composed by 128 physical programming units. Nevertheless, it should be understood that the invention is not limited thereto. Each physical erasing unit is composed by 64 physical programming units, 256 physical programming units or any amount of the physical programming units.

More specifically, each of the physical programming units includes a plurality of word lines and a plurality of bit lines, and a memory cell is disposed at an intersection of each of the word lines and each of the data lines. Each memory cell can store one or more bits. All of the memory cells in the same physical erasing unit are erased together. In the present exemplary embodiment, the physical erasing unit is a minimum unit for erasing. Namely, each physical erasing unit contains the least number of memory cells to be erased together. For instance, the physical erasing unit is a physical block. Furthermore, the memory cells on the same word line constitute one or more of the physical programming units. In case each of the memory cells may store two or more bits, the physical programming units on the same word line may be classified into a lower physical programming unit and an upper physical programming unit. Generally, a writing speed of the lower physical programming unit is faster than a writing speed of the upper physical programming unit. In the present exemplary embodiment, the physical programming unit is a minimum unit for programming. That is, the physical programming unit is the minimum unit for writing data. For example, the physical programming unit is a physical page or a physical sector. In case the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, each of the data bit areas contains 32 physical sectors, and a size of each physical sector is 512-byte (B). However, in other exemplary embodiments, the data bit area may also include 8, 16, or more or less of the physical sectors, and amount and sizes of the physical sectors are not limited in the invention.

In the present exemplary embodiment, a rewritable non-volatile memory module 106 is a Multi Level Cell (MLC) NAND flash memory module which stores at least 2 bits in one cell. The rewritable non-volatile memory module 106 may also be a Single Level Cell (SLC) NAND flash memory module, a Trinary Level Cell (TLC) NAND flash memory module, other flash memory modules or any memory module having the same features.

Figure 5:
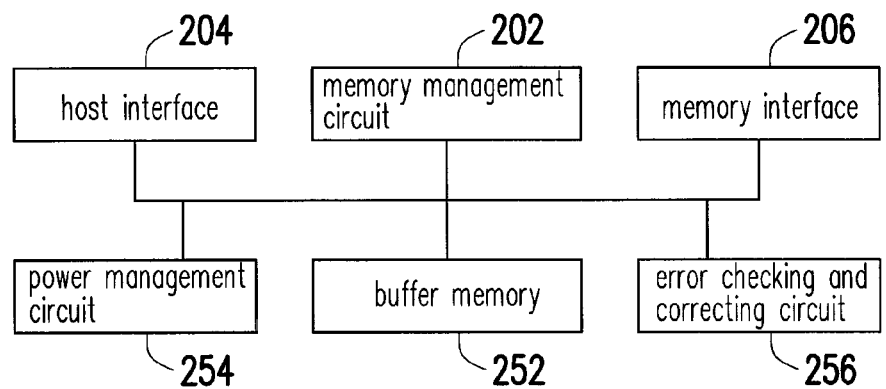
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 104 includes a memory management circuit 202, a host interface 204 and a memory interface 206.

The memory management circuit 202 is configured to control overall operations of the memory control circuit unit 104. Specifically, the memory management circuit 202 has a plurality of control commands. During operations of the memory storage device 100, the control commands are executed to perform various operations such as writing, reading and erasing data. Operations of the memory management circuit 202 are similar to the operations of the memory control circuit unit 104, thus related description is omitted hereinafter.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. When the memory storage device 100 operates, the control commands are executed by the microprocessor to perform operations of writing, reading or erasing data.

In another exemplary embodiment, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 106 to the RAM of the memory management circuit 202 when the memory control circuit unit 104 is enabled. Next, the control commands are executed by the microprocessor unit to perform operations of writing, reading or erasing data.

Further, in another exemplary embodiment, the control commands of the memory management circuit 202 may also be implemented in a form of hardware. For example, the memory management circuit 220 includes a microcontroller, a memory writing unit, a memory reading unit, a memory erasing unit and a data processing unit. The memory management unit, the memory writing unit, the memory reading unit, the memory erasing unit and the data processing unit are coupled to the microprocessor. The memory management unit is configured to manage the physical erasing units of the rewritable non-volatile memory module 106; the memory writing unit is configured to issue a write command to the rewritable non-volatile memory module 106 in order to write data to the rewritable non-volatile memory module; the memory reading unit is configured to issue a read command to the rewritable non-volatile memory module 106 in order to read data from the rewritable non-volatile memory module 106; the memory erasing unit is configured to issue an erase command to the rewritable non-volatile memory module 106 in order to erase data from the rewritable non-volatile memory module 106; the data processing unit is configured to process both the data to be written to the rewritable non-volatile memory module 106 and the data to be read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory control circuit unit 104 further includes a buffer memory 252, a power management circuit 254 and an error checking and correcting circuit 256.

The buffer memory 252 is coupled to the memory management circuit 202 and configured to temporarily store data and commands from the host system 1000 or data from the rewritable non-volatile memory module 106.

The power management unit 254 is coupled to the memory management circuit 202 and configured to control a power of the memory storage device 100.

The error checking and correcting circuit 256 is coupled to the memory management circuit 202 and configured to perform an error checking and correcting process to ensure the correctness of data. Specifically, when the memory management circuit 202 receives a write command from the host system 1000, the error checking and correcting circuit 256 generates an error correcting code (ECC code) for data corresponding to the write command, and the memory management circuit 202 writes data and the ECC code corresponding to the write command to the rewritable non-volatile memory module 106. Subsequently, when the memory management circuit 202 reads the data from the rewritable non-volatile memory module 106, the ECC code corresponding to the data is also read, and the error checking and correcting circuit 256 may execute the error checking and correcting procedure for the read data according to the ECC code.

Figure 6:
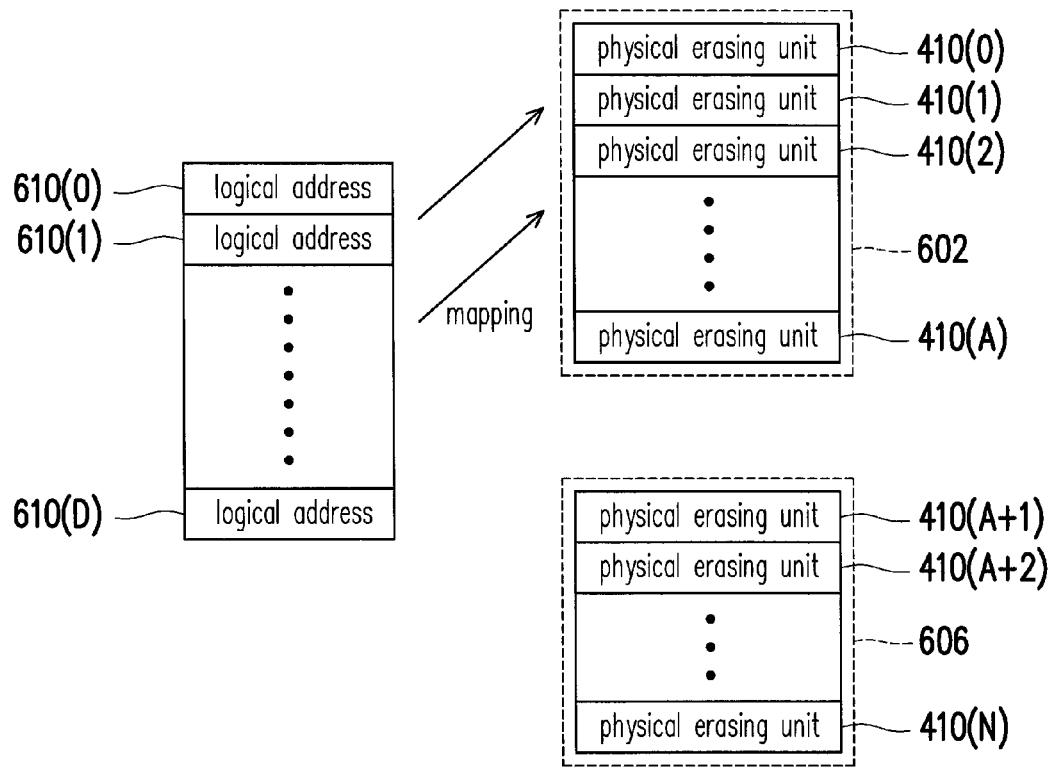
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention.

It should be understood that terms, such as "select", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical erasing units of the rewritable non-volatile memory module are not changed.

Referring to FIG. 6, the memory management circuit 202 may logically group the physical erasing units 410(0) to 410(N) of the rewritable non-volatile memory module 106 into a plurality of areas such as a storage area 602 and a system area 606.

The physical erasing units in the storage area 602 are configured to store data from the host system 1000. The storage area 602 stores valid data and invalid data. For example, when the host system intends to delete one valid data, the data being deleted may still be stored in the storage area 602 but marked as the invalid data. The physical erasing unit not storing the valid data is also known as a spare physical erasing unit. The physical programming unit not storing the valid data is also known as a spare physical programming unit. For example, the physical erasing unit being erased may become the spare physical erasing unit. On the contrary, the physical erasing unit storing the valid data is also known as a non-spare physical erasing unit. The physical programming unit storing the valid data is also known as a non-spare physical programming unit.

In case there are damaged physical erasing units in the storage area 602 or the system area 606, the physical erasing units in the storage area 602 may also be used to replace the damaged physical erasing units. If there are no available physical erasing units in the storage area 602 for replacing the damaged physical erasing units, the memory storage device 100 is announced by the memory management circuit 202 as being in a write protect status, and data cannot be written therein.

The physical erasing units in the system area 606 are configured to record system information including information related to manufacturer and model of a memory chip, a number of physical erasing units in the memory chip, a number of the physical programming unit in each physical erasing unit, and so forth.

Amounts of the physical erasing units in the storage area 602 and the system area 606 may be different to each other based on the different memory specifications. In addition, it should be understood that, during operations of the memory storage device 100, grouping relations of the physical erasing units associated to the storage area 602 and the system area 606 may be dynamically changed. For example, when damaged physical erasing units in the system area 606 are replaced by the physical erasing units in the storage area 602, the physical erasing units originally from the storage area 602 are then associated to the system area 606.

The memory management circuit 202 may configure the logical addresses 610(0) to 610(D) to map to part of the physical erasing units 410(0) to 410(A) in the storage area 602. The host system 1000 may access the data in the storage area 602 through the logical addresses 610(0) to 610(D). In the present exemplary embodiment, one logical address is mapped to one physical sector, and multiple logical addresses constitute one logical programming unit. One logical programming unit is mapped to one or more physical programming units. In an exemplary embodiment, a plurality of logical programming units may constitute one logical erasing unit and one logical erasing unit may be mapped to one or more physical erasing units.

The memory management circuit 202 groups physical erasing units 410(0) to 410(R) in the physical erasing units 410(0) to 410(N) into one or more first physical erasing units and one or more second physical erasing units. Therein, each of the physical erasing units 410(0) to 410(R) is one non-spare physical erasing unit. A quantity of the physical erasing units 410(0) to 410(R) is at least two. The physical erasing units 410(0) to 410(R) may be a part or all of the non-spare physical erasing units in the physical erasing units 410(0) to 410(N).

A data updating frequency of each of the first physical erasing units is lower than the data updating frequency of each of the second physical erasing units. In an exemplary embodiment, the data updating frequency of each of the physical erasing units may be evaluated through a data programming time or a data storage time of each of the physical erasing units, or through a data programming sequence of the physical erasing units. The data programming time refers to a time when one data is written into one physical erasing unit. The data storage time refers to a storage time of one data being stored in one physical erasing unit or an average storage time of a plurality of data being stored in one physical erasing unit. The data storage time may be used to indicate one or more data has been stored in one physical erasing unit for how long. The data programming sequence refers to a precedence for writing a plurality of data into the physical erasing units. In an exemplary embodiment, if the data programming time of a specific physical erasing unit is earlier than the data programming time of another physical erasing unit (or if the data storage time of a specific physical erasing unit is longer than the data storage time of another physical erasing unit), the data updating frequency of the specific physical erasing unit may then be regarded as being lower than said another physical erasing unit. In other words, in this exemplary embodiment, the data programming time of each of the first physical erasing units is earlier than the data programming time of each of the second physical erasing units, and/or the data storage time of each of the first physical erasing units is longer than the data storage time of each of the second physical erasing units.

That is, in an exemplary embodiment, the memory management circuit 202 groups the physical erasing units 410(0) to 410(R) into the one or more first physical erasing units and the one or more second physical erasing units according to the time or the sequence for programming data into each of the physical erasing units 410(0) to 410(R) or the storage time of the data in each of the physical erasing units 410(0) to 410(R). However, in another exemplary embodiment, the data updating frequency of each of the physical erasing units may also be evaluated through a type or a number of access times (e.g., a number of programming times) of the data stored in each of the physical erasing units. For example, the memory management circuit 202 may also group the physical erasing units 410(0) to 410(R) into the one or more first physical erasing units and the one or more second physical erasing units according to whether the type of the data stored in the physical erasing units 410(0) to 410(R) belongs to a type which is often updated, or according to the data updating frequency corresponding to the type or the number of access times of the data stored in the physical erasing units 410(0) to 410(R), which is not particularly limited by the invention. In addition, any information that can be used to evaluate the data updating frequency of the physical erasing unit may be adopted, which is not limited to the above.

Figure 7:
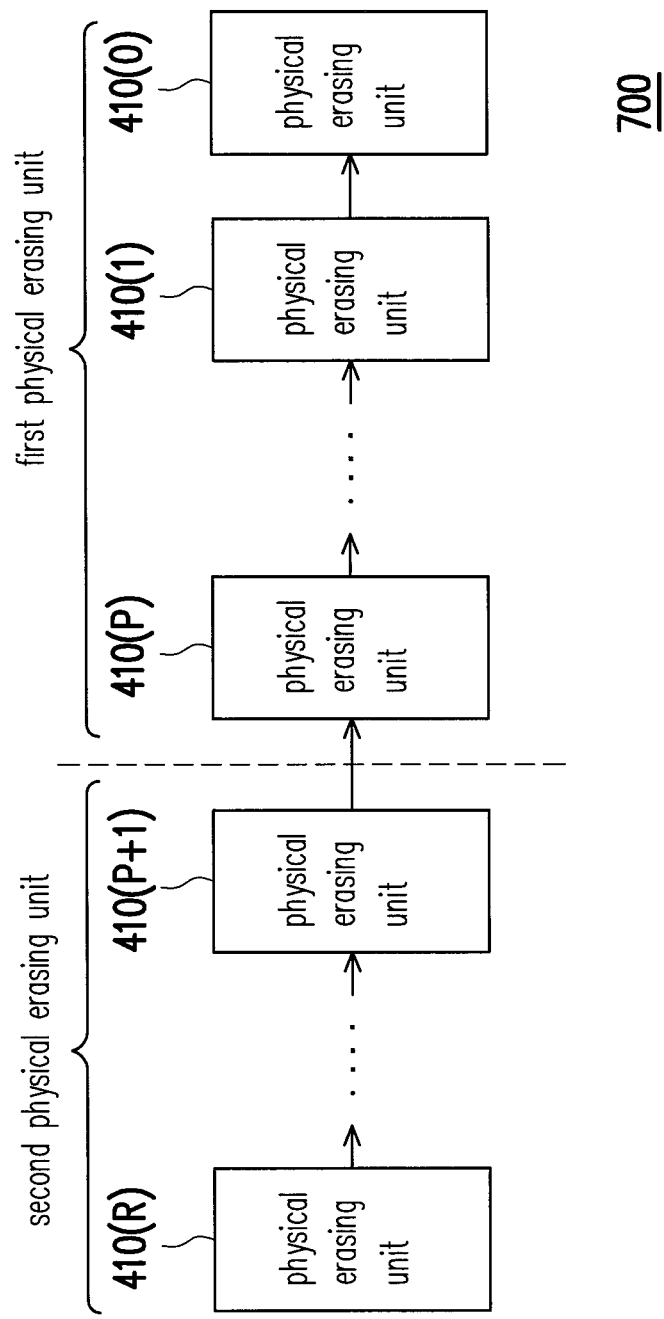
FIG. 7 is a schematic diagram illustrating a serial-connected structure of the non-spare physical erasing units according to an exemplary embodiment of the invention.

FIG. 7 is a schematic diagram illustrating a serial-connected structure of the non-spare physical erasing units according to an exemplary embodiment of the invention.

Referring to FIG. 7, in this exemplary embodiment, before the garbage collection procedure is executed, the memory management circuit 202 sorts the physical erasing units 410(0) to 410(R) according to data programming information. The data programming information is configured to instruct the time and/or the precedence of the data to be written into each of the physical erasing units 410(0) to 410(R). Alternatively, in an exemplary embodiment, the data programming information may also be configured to instruct the data storage time of each of the physical erasing units 410(0) to 410(R). The memory management circuit 202 may utilize a pointer or a flag to serially connect the sorted physical erasing units 410(0) to 410(R), so as to form a serial-connected structure 700. In other words, the serial-connected structure 700 involves a logical serial-connection relation instead of a physical serial-connection relation. As shown in FIG. 7, in the serial-connected structure 700, the physical erasing unit 410(0) at the first from the right has the data programming time being the earliest; the physical erasing unit 410(1) at the second from the right has the data programming time being later than that of the physical erasing unit 410(0) but earlier than the physical erasing unit 410(2); the physical erasing unit 410(R) at the first from the left has the data programming time being the latest; and the rest may be deduced by analogy. From another perspective, since the physical erasing unit 410(0) at the first from the right has the data programming time being the earliest, the data in the physical erasing unit 410(0) has the data storage time being the longest; and, since the physical erasing unit 410(R) has the data programming time being the latest, the data in the physical erasing unit 410(R) has the data storage time of being the shortest.

It should be noted that, the data programming time, the data storage time or the data programming sequence of the physical erasing unit is related to a data updating status or the data updating frequency of each of the physical erasing units. Accordingly, if a position where a specific physical erasing unit is located in the serial-connected structure 700 is at the left of a position where another physical erasing unit is located in the serial-connected structure 700, the data updating frequency of the specific physical erasing unit has great probability of being higher than the data updating frequency of said another physical erasing unit. Alternatively, if the data updating frequency of a specific non-spare physical erasing unit is the highest among all the non-spare physical erasing units, the specific non-spare physical erasing unit has very high probability of being sorted to the first from the left in the serial-connected structure 700 (i.e., a position where the physical erasing unit 410(R) is located in the serial-connected structure 700). If the data updating frequency of a specific non-spare physical erasing unit is the lowest among all the non-spare physical erasing units, the specific non-spare physical erasing unit has very high probability of being sorted to the first from the right in the serial-connected structure 700 (i.e., a position where the physical erasing unit 410(0) is located in the serial-connected structure 700), and the rest may be deduced by analogy.

The memory management circuit 202 groups one or more physical erasing units matching a sorting condition (also known as a first sorting condition) in the sorted physical erasing units 410(0) to 410(R) into the first physical erasing unit, and groups one or more physical erasing units not matching the first sorting condition in the sorted physical erasing units 410(0) to 410(R) into the second physical erasing unit. In an exemplary embodiment, the physical erasing units matching the first sorting condition in the sorted physical erasing units 410(0) to 410(R) are a P number of physical erasing units having the data being written earlier (which includes the physical erasing unit having the data being written the earliest). For example, in an exemplary embodiment, the P number of physical erasing units 410(0) to 410(P) started at the first from the right and serially connected in the serial-connected structure 700 of FIG. 7 matches the first sorting condition, and the physical erasing units 410(P+1) to 410(R) does not match the first sorting condition. In an exemplary embodiment, the P number correspondingly changes with changes of a quantity of the physical erasing units 410(0) to 410(R), so that a quantity (also known as a first quantity) of the first physical erasing units and a quantity (also known as a second quantity) of the second physical erasing units are maintained at a preset proportion. For example, the preset proportion may be 95:5. For example, in an exemplary embodiment, if the quantity of the physical erasing units 410(0) to 410(R) is 100, the first quantity may be 95 and the second quantity may be 5. In addition, the preset proportion may also be adjusted instead of being limited to the above.

The memory management circuit 202 may select one or more third physical erasing units from the physical erasing units belonging to the first physical erasing units. In an exemplary embodiment, the memory management circuit 202 may select one or more physical erasing units matching a valid data condition and/or another sorting condition (also known as a second sorting condition) from the one or more physical erasing units belonging to the first physical erasing units to serve as the third physical erasing unit. For example, in an exemplary embodiment, the physical erasing units matching the valid data condition may be, among the physical erasing units belonging to the first physical erasing units, those stored with a data quantity of the valid data being fewer, or those stored with a data quantity of the valid data being less than a preset value, but the invention is not limited thereto. In an exemplary embodiment, any algorithm that performs operations on basis of the data quantity (or data size) of the valid data may be used to set the valid data condition. Moreover, the physical erasing units matching the second sorting condition may be a Q number of physical erasing units having the data being written earlier in the physical erasing units belonging to the first physical erasing units (e.g., the physical erasing units 410(0) to 410(Q) serially connected in the serial-connected structure 700, wherein Q is less than P).

The memory management circuit 202 executes the garbage collection procedure on the third physical erasing units. For example, the memory management circuit 202 selects one or more fourth physical erasing units from one or more spare physical erasing units in the physical erasing units 410(0) to 410(N), and copies the valid data stored in each of the third physical erasing units to the fourth physical erasing units. After the valid data is copied from the third physical erasing units to the fourth physical erasing units, the valid data in the third physical erasing units are marked as invalid data, and the third physical erasing units may be erased by the memory management circuit 202. Accordingly, each time the garbage collection procedure is executed, the memory management circuit 202 may release one or more spare physical erasing units (i.e., which are once the third physical erasing units). In an exemplary embodiment, the memory management circuit 202 erases the third physical erasing units at a specific time point. For example, the memory management circuit 202 may erase the third physical erasing units after execution of the garbage collection procedure is completed. However, the specific time point may also be time points when the memory storage device 100 is turned on or turned off, or when the memory storage device 100 is idle for exceeding a preset time, or any time points, which is not particularly limited by the invention.

In an exemplary embodiment, in one garbage collection procedure, the memory management circuits 202 only copies the valid data stored in the third physical erasing units to the fourth physical erasing units without copying the valid data stored in any one of the physical erasing units other than the third physical erasing units to the fourth physical erasing unit.

In addition, in an exemplary embodiment, the data quantity of the valid data stored in one of the first physical erasing units is more than the data quantity of the valid data stored in one of the second physical erasing units. For example, in the serial-connected structure 700 in FIG. 7, it is assumed that the data quantity of the valid data stored in the physical erasing unit 410(P+1) is the size of two physical erasing units and the data quantity of the valid data stored in the physical erasing unit 410(P) is the size of three physical erasing units, then it indicates that the data quantity of the valid data stored in the physical erasing unit 410(P) is more than the data quantity of the valid data stored in the physical erasing unit 410(P+1). In addition, a unit used to evaluate the data quantity may also be arbitrary units instead of being limited to the above.

Figure 8:
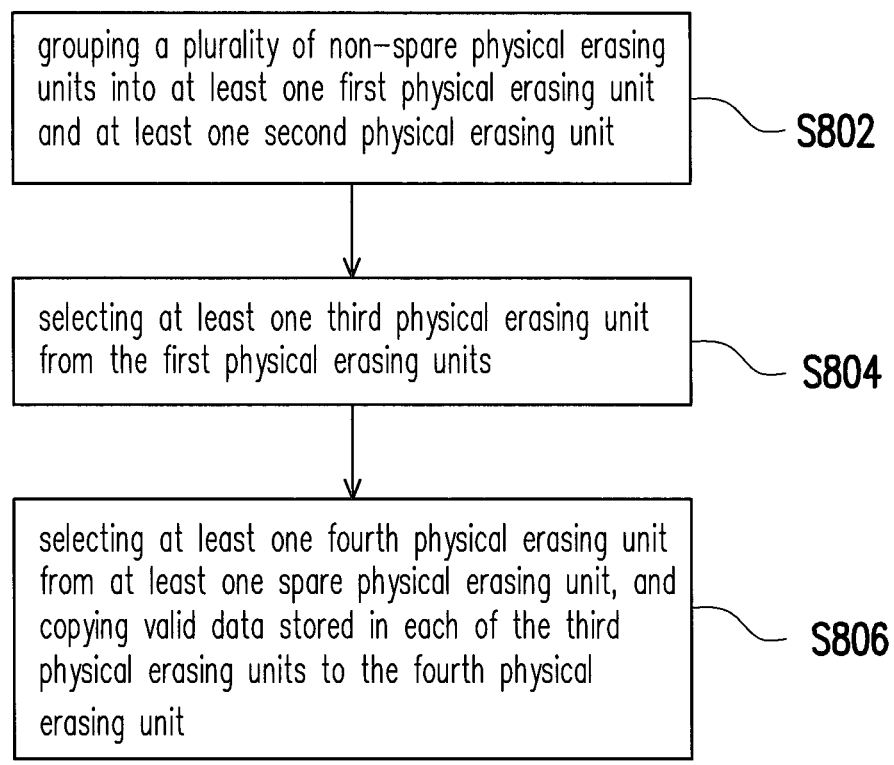
FIG. 8 is a flowchart illustrating a memory management method according to an embodiment of the invention.

FIG. 8 is a flowchart illustrating a memory management method according to an embodiment of the invention.

Referring to FIG. 8, in step S802, a plurality of non-spare physical erasing units are grouped into at least one first physical erasing unit and at least one second physical erasing unit. A data updating frequency of each of the first physical erasing units is lower than the data updating frequency of each of the second physical erasing units.

In step S804, at least one third physical erasing unit is selected from the first physical erasing unit (or from the physical erasing units belonging to the first physical erasing unit).

In step S806, at least one fourth physical erasing unit is selected from the physical erasing units belonging to at least one spare physical erasing unit, and valid data stored in each of the third physical erasing unit are copied to the fourth physical erasing unit.

Nevertheless, steps depicted in FIG. 8 are described in detail as above, thus related description is omitted hereinafter. It should be noted that, the steps depicted in FIG. 8 may be implemented as a plurality of program codes or circuits, and the invention is not limited thereto. In addition, the method disclosed in FIG. 8 can be used accompanying the foregoing exemplary embodiments, or can be used separately, and the invention is not limited thereto.

In summary, the memory management method, the memory storage device and the memory control circuit unit of the invention are capable of grouping a plurality of non-spare physical erasing units into one or more first physical erasing units having lower updating frequency and one or more second physical erasing units having higher updating frequency. Next, one or more third physical erasing units are selected from the one or more first physical erasing units having lower updating frequency, and the garbage collection procedure is executed for the one or more third physical erasing units. Accordingly, after the garbage collection procedure is executed, waste of system resources due to the problem in which the valid data is considered as invalid after being updated again may be effectively reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method, for managing a rewritable non-volatile memory module having a plurality of physical erasing units, and the memory management method comprising:
grouping a plurality of non-spare physical erasing units in the physical erasing units into at least one first physical erasing unit and at least one second physical erasing unit according to a data quantity of valid data stored in each non-spare physical erasing unit, wherein the data quantity of the valid data stored in the at least one first physical erasing unit is more than the data quantity of the valid data stored in the at least one second physical erasing unit, and a data updating frequency of each of the at least one first physical erasing unit is lower than the data updating frequency of each of the at least one second physical erasing unit;
selecting at least one third physical erasing unit from the at least one first physical erasing unit, wherein the at least one third physical erasing unit stores a quantity of valid data less than a preset value; and
selecting at least one fourth physical erasing unit from at least one spare physical erasing unit in the physical erasing units, and copying valid data stored in each of the at least one third physical erasing unit to the at least one fourth physical erasing unit.

2. The memory management method of claim 1, wherein a data programming time of each of the at least one first physical erasing unit is earlier than the data programming time of each of the at least one second physical erasing unit.

3. The memory management method of claim 1, wherein the step of grouping the non-spare physical erasing units into the at least one first physical erasing unit and the at least one second physical erasing unit comprises:
sorting the non-spare physical erasing units according to data programming information; and
grouping at least one physical erasing unit matching a first sorting condition in the sorted non-spare physical erasing units into the at least one first physical erasing unit, and grouping at least one physical erasing unit not matching the first sorting condition in the sorted non-spare physical erasing units into the at least one second physical erasing unit.

4. The memory management method of claim 1, wherein a first quantity of the at least one first physical erasing unit and a second quantity of the at least one second physical erasing unit are maintained at a preset proportion.

5. The memory management method of claim 1, wherein the step of selecting the at least one third physical erasing unit from the at least one first physical erasing unit comprises:
selecting at least one physical erasing unit matching a valid data condition and/or a second sorting condition from the at least one first physical erasing unit to serve as the at least one third physical erasing unit.

6. The memory management method of claim 1, further comprising:
erasing the at least one third physical erasing unit.

7. A memory storage device, comprising:
a connection interface unit configured to couple to a host system;
a rewritable non-volatile memory module comprising a plurality of physical erasing units; and
a memory control circuit unit coupled to the connection interface unit and the rewritable non-volatile memory module,
wherein the memory control circuit unit is configured to group a plurality of non-spare physical erasing units in the physical erasing units into at least one first physical erasing unit and at least one second physical erasing unit according to a data quantity of valid data stored in each non-spare physical erasing unit, wherein the data quantity of the valid data stored in the at least one first physical erasing unit is more than the data quantity of the valid data stored in the at least one second physical erasing unit, and a data updating frequency of each of the at least one first physical erasing unit is lower than the data updating frequency of each of the at least one second physical erasing unit,
the memory control circuit unit is further configured to select at least one third physical erasing unit from the at least one first physical erasing unit, wherein the at least one third physical erasing unit stores a quantity of valid data less than a preset value, and
the memory control circuit unit is further configured to select at least one fourth physical erasing unit from at least one spare physical erasing unit in the physical erasing units, and copy valid data stored in each of the at least one third physical erasing unit to the at least one fourth physical erasing unit.

8. The memory storage device of claim 7, wherein a data programming time of each of the at least one first physical erasing unit is earlier than the data programming time of each of the at least one second physical erasing unit.

9. The memory storage device of claim 7, wherein the operation of the memory control circuit unit grouping the non-spare physical erasing units into the at least one first physical erasing unit and the at least one second physical erasing unit comprises:
the memory control circuit unit sorts the non-spare physical erasing units according to data programming information; and
the memory control circuit unit groups at least one physical erasing unit matching a first sorting condition in the sorted non-spare physical erasing units into the at least one first physical erasing unit, and groups at least one physical erasing unit not matching the first sorting condition in the sorted non-spare physical erasing units into the at least one second physical erasing unit.

10. The memory storage device of claim 7, wherein a first quantity of the at least one first physical erasing unit and a second quantity of the at least one second physical erasing unit are maintained at a preset proportion.

11. The memory storage device of claim 7, wherein the operation of the memory control circuit unit selecting the at least one third physical erasing unit from the at least one first physical erasing unit comprises:
the memory control circuit unit selects at least one physical erasing unit matching a valid data condition and/or a second sorting condition from the at least one first physical erasing unit to serve as the at least one third physical erasing unit.

12. The memory storage device of claim 7, wherein the memory control circuit unit is further configured to erase the at least one third physical erasing unit.

13. A memory control circuit unit, configured to control a rewritable non-volatile memory module and the memory control circuit unit comprises:
a host interface configured to couple to a host system;
a memory interface, configured to couple to the rewritable non-volatile memory module, wherein the rewritable non-volatile memory module comprises a plurality of physical erasing units; and a memory management circuit coupled to the host interface and the memory interface, wherein the memory management circuit is configured to group a plurality of non-spare physical erasing units in the physical erasing units into at least one first physical erasing unit and at least one second physical erasing unit according to a data quantity of valid data stored in each non-spare physical erasing unit, wherein the data quantity of the valid data stored in the at least one first physical erasing unit is more than the data quantity of the valid data stored in the at least one second physical erasing unit, and a data updating frequency of each of the at least one first physical erasing unit is lower than the data updating frequency of each of the at least one second physical erasing unit, the memory management circuit is further configured to select at least one third physical erasing unit from the at least one first physical erasing unit, wherein the at least one third physical erasing unit stores a quantity of valid data less than a preset value, and the memory management circuit is further configured to select at least one fourth physical erasing unit from at least one spare physical erasing unit in the physical erasing units, and copy valid data stored in each of the at least one third physical erasing unit to the at least one fourth physical erasing unit.

14. The memory control circuit unit of claim 13, wherein a data programming time of each of the at least one first physical erasing unit is earlier than the data programming time of each of the at least one second physical erasing unit.

15. The memory control circuit unit of claim 13, wherein the operation of the memory management circuit grouping the non-spare physical erasing units into the at least one first physical erasing unit and the at least one second physical erasing unit comprises:

the memory management circuit sorts the non-spare physical erasing units according to data programming information; and the memory management circuit groups at least one physical erasing unit matching a first sorting condition in the sorted non-spare physical erasing units into the at least one first physical erasing unit, and groups at least one physical erasing unit not matching the first sorting condition in the sorted non-spare physical erasing units into the at least one second physical erasing unit.

16. The memory control circuit unit of claim 13, wherein a first quantity of the at least one first physical erasing unit and a second quantity of the at least one second physical erasing unit are maintained at a preset proportion.

17. The memory control circuit unit of claim 13, wherein the operation of the memory management circuit selecting the at least one third physical erasing unit from the at least one first physical erasing unit comprises:

the memory management circuit selects at least one physical erasing unit matching a valid data condition and/or a second sorting condition from the at least one first physical erasing unit to serve as the at least one third physical erasing unit.

18. The memory control circuit unit of claim 13, wherein the memory management circuit is further configured to erase the at least one third physical erasing unit.

* * * * *